(12) United States Patent
Adachi (10) Patent No.: US 10,264,557 B2
(45) Date of Patent: Apr. 16, 2019

(54) USER TERMINAL AND PROCESSOR PERFORMING D2D COMMUNICATION

(71) Applicant: KYOCERA CORPORATION, Kyoto (JP)

(72) Inventor: Hiroyuki Adachi, Kawasaki (JP)

(73) Assignee: KYOCERA Corporation, Kyoto (JP)

(*) Notice: Subject to any disclaimer, the term of this patent is extended or adjusted under 35 U.S.C. 154(b) by 57 days.

(21) Appl. No.: 15/512,407

(22) PCT Filed: Sep. 24, 2015

(86) PCT No.: PCT/JP2015/076887
§ 371 (c)(1),
(2) Date: Mar. 17, 2017

(87) PCT Pub. No.: WO2016/047671
PCT Pub. Date: Mar. 31, 2016

(65) Prior Publication Data
US 2017/0273064 A1 Sep. 21, 2017

(30) Foreign Application Priority Data
Sep. 26, 2014 (JP) .................. 2014-197608

(51) Int. Cl.
*H04W 72/04* (2009.01)
*H04W 4/20* (2018.01)
*H04W 4/08* (2009.01)
*H04W 8/00* (2009.01)
*H04W 28/02* (2009.01)
*H04W 72/12* (2009.01)
*H04W 76/14* (2018.01)
*H04W 88/02* (2009.01)

(52) U.S. Cl.
CPC ........ *H04W 72/0406* (2013.01); *H04W 4/08* (2013.01); *H04W 8/005* (2013.01); *H04W 28/0278* (2013.01); *H04W 72/12* (2013.01); *H04W 76/14* (2018.02); *H04W 72/1247* (2013.01); *H04W 88/02* (2013.01)

(58) Field of Classification Search
CPC . H04W 72/0406; H04W 76/14; H04W 72/12; H04W 8/005; H04W 28/0278; H04W 4/08; H04W 72/1247; H04W 88/02
See application file for complete search history.

(56) References Cited

U.S. PATENT DOCUMENTS

2016/0205525 A1* 7/2016 Baghel .................... H04W 4/22
370/329
2018/0184400 A1* 6/2018 Kim ...................... H04W 72/04

OTHER PUBLICATIONS

International Search Report issued in PCT/JP2015/076887; dated Dec. 15, 2015.

(Continued)

*Primary Examiner* — Kiet Tang
(74) *Attorney, Agent, or Firm* — Studebaker & Brackett PC (57) ABSTRACT

A user terminal according to the present embodiment comprises: a controller configured to perform control of transmitting at least one or more group identifiers among a plurality of group identifiers comprising of an identifier associated with each of a plurality of D2D groups in D2D communication being direct inter-terminal communication to a base station as an identifier of a destination of data in the D2D communication.

4 Claims, 6 Drawing Sheets

(56) References Cited

OTHER PUBLICATIONS

Written Opinion issued in PCT/JP2015/076887; dated Dec. 15, 2015.
3rd Generation Partnership Project; Technical Specification Group Radio Access Network; Study on LTE Device to Device Proximity Services; Radio Aspects; 3GPP TR 36.843 V12.0.1; Mar. 2014; pp. 1-50; Release 12; 3GPP Organizational Partners.
Qualcomm Incorporated; "Resource Allocation for Mode 1 D2D Broadcast Communication"; 3GPP TSG-RAN WG2 #86; R2-142589; May 19-23, 2014; pp. 1-7; Seoul, South Korea.
Huawei, HiSilicon; "Discussion on ProSe-BSR Format"; 3GPP TSG-RAN WG2 #87; R2-143810; Aug. 18-22, 2014; pp. 1-3; Dresden, Germany.
General Dynamics UK Ltd; "Including the Target Group ID in the ProSe-BSR"; 3GPP TSG-RAN2 #87; R2-143092; Aug. 18-22, 2014; pp. 1-3; Dresden, Germany.
Orange; "Pseudo-CR on Description of the Direct Discovery Authorization Procedure"; 3GPP TSG CT4 #65; :4-141082; May 19-23, 2014; pp. 1-5; Phoenix, US.
An Office Action; "Notice of Reasons for Rejection," dated by the Japanese Patent Office Dec. 15, 2015, which corresponds to Japanese Patent Application No. 2015-551652 and is related to the present application; with English language Concise Explanation.
An Office Action; "Notice of Reasons for Rejection," dated by the Japanese Patent Office May 24, 2016, which corresponds to Japanese Patent Application No. 2015-551652 and is related to the present application; with English language Concise Explanation.

\* cited by examiner

USER TERMINAL AND PROCESSOR PERFORMING D2D COMMUNICATION

TECHNICAL FIELD

The present application relates to a user terminal and a base station used in a mobile communication system supporting the D2D proximity service.

BACKGROUND ART

In 3GPP (3rd Generation Partnership Project) being a standardization project of a mobile communication system, the introduction of the inter-terminal (Device to Device: D2D) proximity service has been studied as a new feature in release 12 or later (see Non Patent Literature 1).

The D2D proximity service (D2D ProSe) is a service that enables direct inter-terminal communication in the synchronous cluster including a plurality of synchronized user terminals. The D2D proximity service includes the D2D discovery procedure (Discovery) configured to discover the proximity terminal and the D2D communication (Communication) being the direct inter-terminal communication.

By the way, the user terminal has a problem that the transmission and the reception of the D2D radio signal cannot be performed at the same time in the D2D proximity service (what is called, the Half-Duplex problem). For this reason, in the In-coverage scenario where all user terminal forming a synchronization cluster including a plurality of synchronized user terminals are located in the cell coverage, it is discussed that the base station assigns the time and frequency resources for transmitting the D2D radio signal. The base station assigns the time and frequency resources so that a plurality of user terminals configured to transmit the D2D radio signal at the same timing in the synchronization cluster do not exist, whereby the Half-Duplex problem can be solved.

CITATION LIST

Non Patent Literature

Non Patent Literature 1: 3GPP Technical Report, "TR 36.843 V12.0.1.", Mar. 27, 2014

SUMMARY OF THE INVENTION

Problems to be Solved by the Invention

A user terminal according to an embodiment comprises: a controller configured to perform control of transmitting at least one or more group identifiers among a plurality of group identifiers comprising of an identifier associated with each of a plurality of D2D groups in D2D communication being direct inter-terminal communication to a base station as an identifier of a destination of data in the D2D communication.

A processor is provided in a user terminal. The processor is configured to control the user terminal so as to transmit at least one or more group identifiers among a plurality of group identifiers comprising of an identifier associated with each of a plurality of D2D groups in D2D communication being direct inter-terminal communication to a base station as an identifier of a destination of data in the D2D communication.

DESCRIPTION OF EMBODIMENTS

[Overview of Embodiment]

In the above conventional technologies, the case where one user terminal belongs to a plurality of D2D groups (synchronous clusters) is not assumed. For this reason, the timing when the user terminal belonging to the first and the second D2D groups transmits a D2D radio signal to the first D2D group may be the same as the transmission timing of the second terminal belonging to the second D2D group, even when the timing is different from the transmission timing of the first terminal belonging to the first D2D group. As a result, the user terminal may fail to receive the D2D radio signal from the second terminal.

Accordingly, the present application has an object to make it possible to reduce the failure of reception of the D2D radio signal even when a user terminal belongs to a plurality of D2D groups.

A user terminal according to an embodiment comprises: a controller configured to perform control of transmitting at least one or more group identifiers among a plurality of group identifiers comprising of an identifier associated with each of a plurality of D2D groups in D2D communication being direct inter-terminal communication to a base station as an identifier of a destination of data in the D2D communication.

In the embodiment, the controller performs control of transmitting the one or more group identifiers to the base station before transmission or at a transmission timing of a buffer status report for reporting transmission waiting data in the D2D communication.

In the embodiment, the controller performs control of transmitting the one or more group identifiers to the base station when there is an indication of transmission of the D2D communication in the user terminal.

A processor according to the embodiment is provided in a user terminal. The processor being configured to control the user terminal so as to transmit at least one or more group identifiers among a plurality of group identifiers comprising of an identifier associated with each of a plurality of D2D groups in D2D communication being direct inter-terminal communication to a base station as an identifier of a destination of data in the D2D communication.

It should be noted that the present embodiment also includes the following contents.

The user terminal according to the first embodiment is used in a mobile communication system supporting the D2D proximity service. The user terminal comprises a storage configured to store a plurality of group identifiers including the respective identifiers corresponding to the plurality of D2D groups related to the self-user terminal in the D2D proximity service, and a controller configured to perform the control of transmitting at least one or more group identifiers to the base station among the plurality of group identifiers when the self-user terminal is connected to the base station.

In the first embodiment, the at least one or more group identifiers are the identifiers indicating all the D2D groups where the self-user terminal can participate among the plurality of D2D groups.

In the first embodiment, the at least one or more group identifiers are the identifiers indicating the D2D groups where the self-user terminal desires at least one of the transmission and reception of the D2D radio signal among the plurality of D2D groups.

In the first embodiment, the at least one or more group identifiers are the identifiers indicating the D2D groups taking priority over other D2D groups among the plurality of D2D groups.

The user terminal according to the first embodiment is used in a mobile communication system supporting the D2D proximity service. The user terminal comprises a storage configured to store a plurality of group identifiers including the respective identifiers corresponding to the plurality of D2D groups related to the self-user terminal in the D2D proximity service, and a controller configured to perform the control of transmitting the ProSe indication including at least one or more group identifiers to the base station among the plurality of group identifiers.

In the first embodiment, the controller performs the control of transmitting a buffer status report for reporting the transmission waiting data in the D2D proximity service to the base station. The controller performs the control of transmitting the ProSe indication to the base station at a timing different from the buffer status report.

In the first embodiment, the controller performs the control of transmitting the ProSe indication to the base station when the self-user terminal is interested in the D2D proximity service.

In the first embodiment, the at least one or more group identifiers are the identifiers indicating the D2D groups where the self-user terminal desires at least one of the transmission and reception of the D2D radio signal among the plurality of D2D groups.

In the first embodiment, the at least one or more group identifiers are the identifiers indicating the D2D groups taking priority over other D2D groups among the plurality of D2D groups.

The user terminal according to the first embodiment is used in a mobile communication system supporting the D2D proximity service. The user terminal comprises a storage configured to store a plurality of group identifiers including the respective identifiers corresponding to the plurality of D2D groups related to the self-user terminal in the D2D proximity service, and a controller configured to perform the control of transmitting the buffer status report for reporting the transmission waiting data in the D2D proximity service. The controller includes the identifier indicating the D2D group from which the self-user terminal desires to receive the D2D radio signal among the plurality of D2D groups in the buffer status report.

In the first embodiment, the at least one or more group identifiers are the identifiers indicating the D2D groups taking priority over other D2D groups among the plurality of D2D groups.

The base station according to (the second modification of) the first embodiment is used in a mobile communication system supporting the D2D proximity service. The base station comprises a receiver configured to receive at least one or more group identifiers corresponding to the D2D groups related to the predetermined user terminal in the D2D proximity service from the higher-level network device of the base station.

In the first embodiment, the at least one or more group identifiers are the identifiers indicating all the D2D groups where the predetermined user terminal can participate.

In the first embodiment, when the predetermined user terminal is connected to the base station, at least one or more group identifiers corresponding to the D2D groups related to the predetermined user terminal are received.

In the first embodiment, the at least one or more group identifiers corresponding to the D2D groups related to the predetermined user terminal are included in the context information notified from the higher-level network device of the base station.

The user terminal according to the first embodiment is used in a mobile communication system supporting the D2D proximity service. The user terminal transmits the information related to the D2D group different from the D2D group where at least the self-user terminal transmits the information among the plurality of D2D groups related to the self-user terminal in the D2D proximity service to the base station.

It should be noted that "group identifier" and "information relating to a D2D group" described in the claims may be an identifier directly indicating a D2D group, and may be an identifier (index) indirectly indicating a D2D group.

[First Embodiment]

Hereinafter, the first embodiment in a case where contents of the present application are applied to an LTE system will be described.

(System Configuration)

Figure 1:
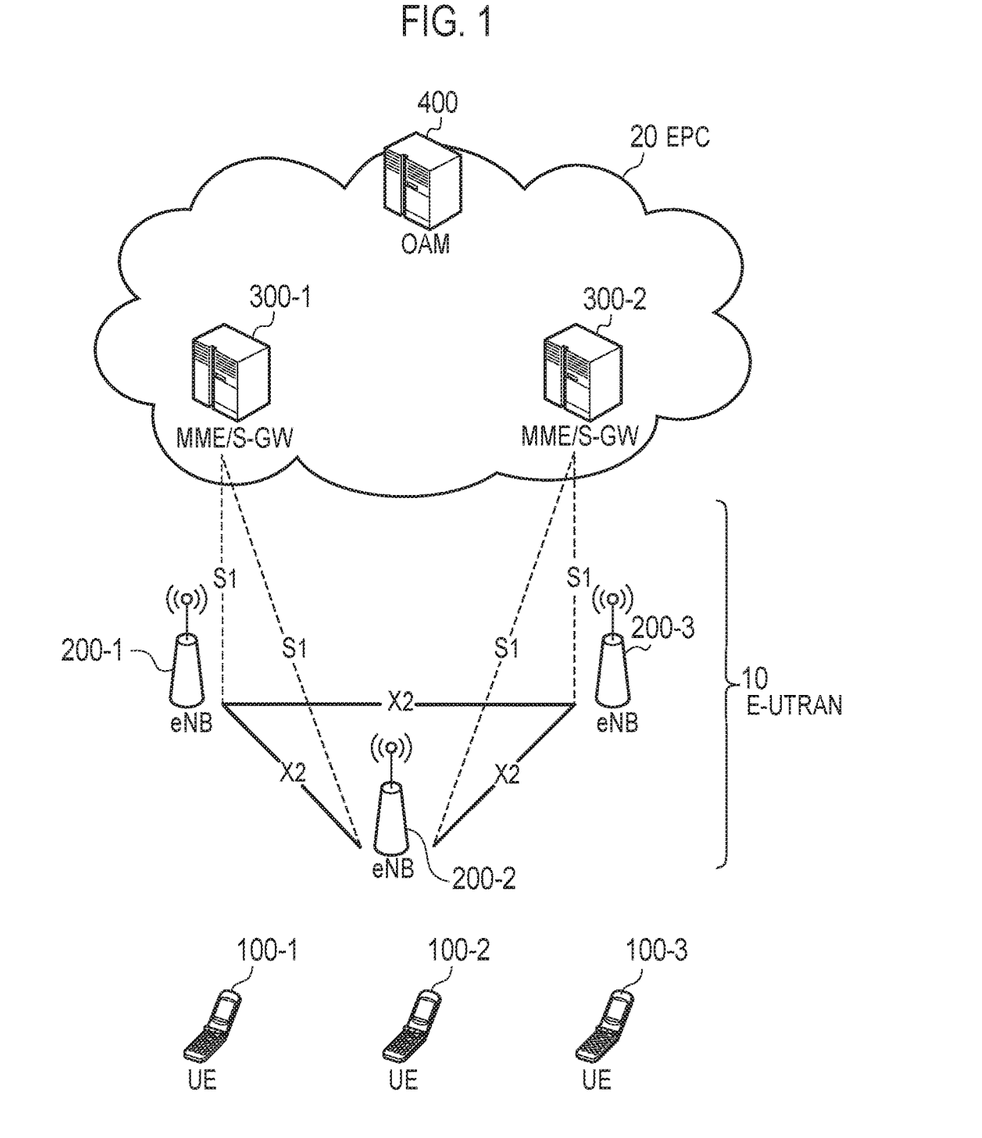
FIG. 1 is a configuration diagram of an LTE system.

FIG. 1 is a configuration diagram of an LTE system according to an embodiment. As shown in FIG. 1, the LTE system according to the embodiment includes UEs (User Equipments) 100, E-UTRAN (Evolved Universal Terrestrial Radio Access Network) 10, and EPC (Evolved Packet Core) 20.

The UE 100 corresponds to a user terminal. The UE 100 is a mobile communication device and performs radio communication with a connected cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 200 will be described later.

The eNB 200 manages a cell or a plurality of cells and performs radio communication with the UE 100 that establishes a connection with the cell of the eNB 200. The eNB 200, for example, has a radio resource management (RRM) function, a function of routing user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. A network of the LTE system (a LTE network) is configured by the E-UTRAN 10 and the EPC 20. The EPC 20 includes MME (Mobility Management Entity)/S-GW (Serving-Gateway) 300 and an OAM (Operation and Maintenance) 400. The MME performs various mobility controls and the like, for the UE 100. The S-GW performs control to transfer user data. The MME/S-GW 300 is connected to the eNB 200 via an S1 interface.

The OAM 400 is a server device managed by an operator and performs maintenance and monitoring of the E-UTRAN 10.

Figure 2:
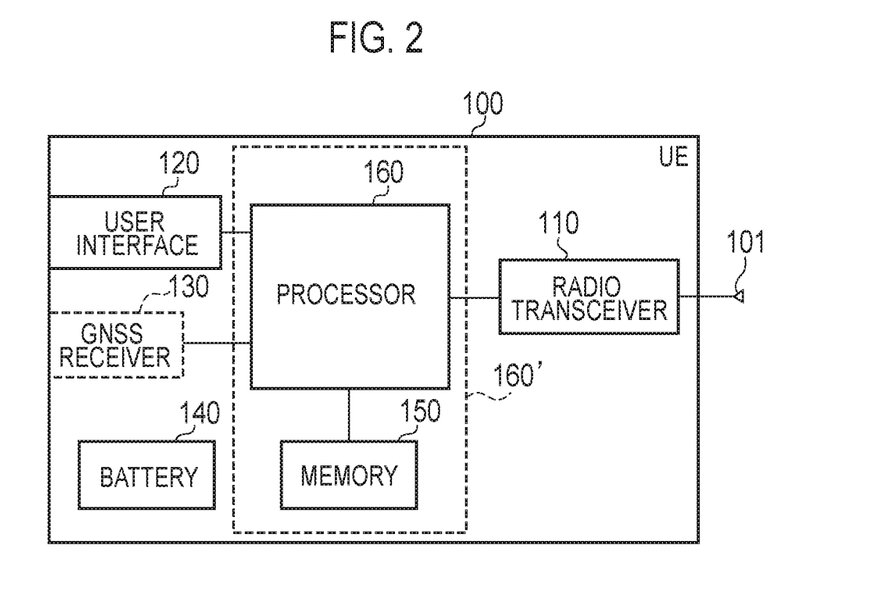
FIG. 2 is a block diagram of a UE.

FIG. 2 is a block diagram of the UE 100. As shown in FIG. 2, the UE 100 includes an antenna 101, a radio transceiver 110, a user interface 120, GNSS (Global Navigation Satellite System) receiver 130, a battery 140, a memory 150, and a processor 160. The memory 150 corresponds to a storage, and the processor 160 corresponds to a controller. The UE 100 may not have the GNSS receiver 130. Furthermore, the memory 150 may be integrally formed with the processor 160, and this set (that is, a chip set) may be a processor 160'.

The antenna 101 and the radio transceiver 110 are used to transmit and receive a radio signal. The radio transceiver 110 converts a baseband signal (a transmission signal) output from the processor 160 into the radio signal, and transmits the radio signal from the antenna 101. Furthermore, the radio transceiver 110 converts a radio signal (a reception signal) received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
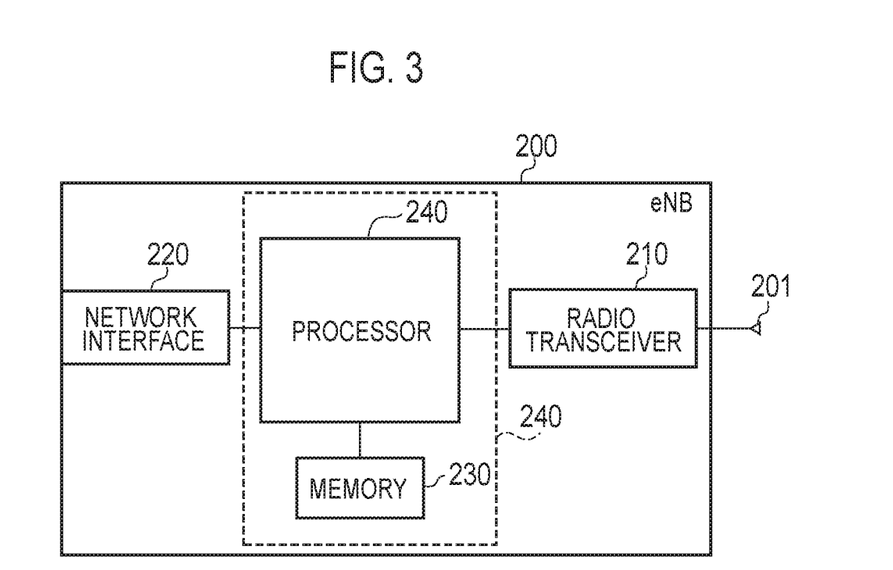
FIG. 3 is a block diagram of an eNB.

FIG. 3 is a block diagram of the eNB 200. As shown in FIG. 3, the eNB 200 includes an antenna 201, a radio transceiver 210, a network interface 220, a memory 230, and a processor 240. It is note that the memory 230 may be integrated with the processor 240, and this set (that is, a chipset) may be a processor 240'.

The antenna 201 and the radio transceiver 210 are used to transmit and receive a radio signal. The radio transceiver 210 converts a baseband signal (a transmission signal) output from the processor 240 into the radio signal, and transmits the radio signal from the antenna 201. Furthermore, the radio transceiver 210 converts a radio signal (a reception signal) received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
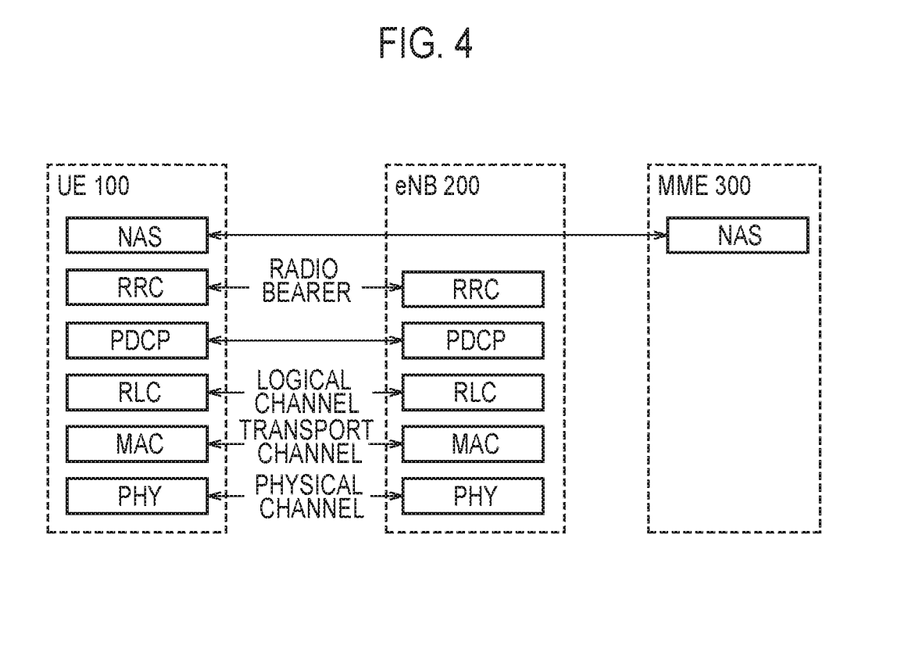
FIG. 4 is a protocol stack diagram.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and a control signal are transmitted through the physical channel.

The MAC layer performs priority control of data, and a retransmission process and the like by hybrid ARQ (HARQ). Between the MAC layer of the UE 100 and the MAC layer of the eNB 200, user data and a control signal are transmitted via a transport channel. The MAC layer of the eNB 200 includes a transport format of an uplink and a downlink (a transport block size, a modulation and coding scheme) and a scheduler to decide (schedule) an allocated resource block to the UE 100.

The RLC layer transmits data to an RLC layer of a reception side by using the functions of the MAC layer and the PHY layer. Between the RLC layer of the UE 100 and the RLC layer of the eNB 200, user data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state, and when the connection is not established, the UE 100 is in an RRC idle state.

NAS (Non-Access Stratum) layer positioned above the RRC layer performs session management, mobility management and the like.

Figure 5:
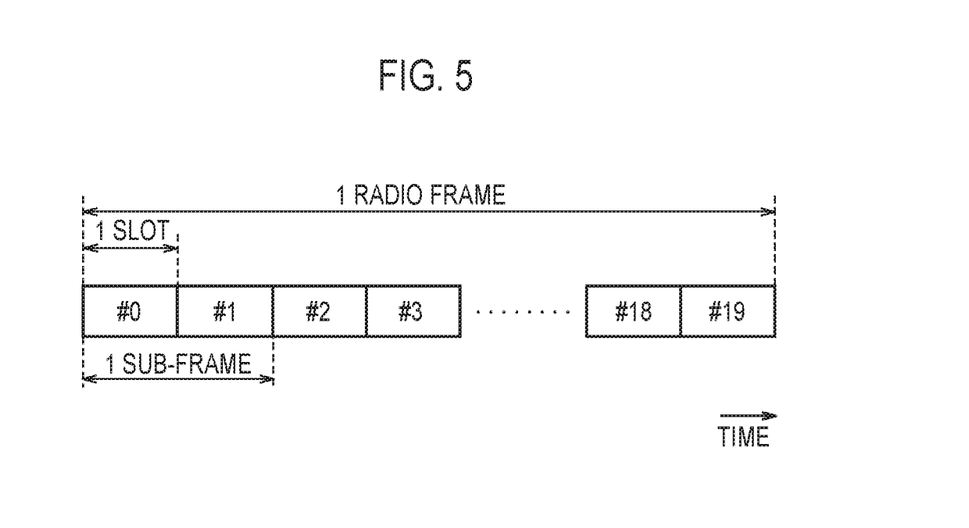
FIG. 5 is a configuration diagram of a radio frame.

FIG. 5 is a configuration diagram of a radio frame used in the LTE system. In the LTE system, OFDMA (Orthogonal Frequency Division Multiplexing Access) is employed in a downlink (DL), and SC-FDMA (Single Carrier Frequency Division Multiple Access) is employed in an uplink (UL), respectively.

As shown in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A resource element is configured by one subcarrier and one symbol. Among radio resources allocated to the UE 100, a frequency resource is configured by a resource block and a time resource is configured by a subframe (or slot).

(D2D Proximity Service)

In the following, the D2D proximity service will be described. The LTE system according to the embodiment supports the D2D proximity service. Although the D2D proximity service is described in Non Patent Literature 1, the summary will be described here.

The D2D proximity service (D2D ProSe) is a service that enables the direct inter-UE communication in the synchronous cluster including a plurality of synchronized UE 100. The D2D proximity service includes the D2D discovery procedure configured to discover the proximity UE (Discovery) and the D2D communication (Communication) being the direct inter-UE communication. The D2D communication is also referred to as "Direct communication".

The scenario where all the UE 100 forming a synchronous cluster is located inside the cell coverage is referred to as "In coverage". The scenario where all the UE 100 forming a synchronous cluster is located outside the cell coverage is referred to as "Out of coverage". The scenario where part of the UE 100 is located inside the cell coverage, and the rest of the UE 100 is located outside the cell coverage among the synchronous cluster is referred to as "Partial coverage".

In the "In coverage", for example, the eNB 200 becomes the D2D synchronous source. The D2D non-synchronous source is synchronized with the D2D synchronous source without transmitting the D2D synchronization signal. The eNB 200 being the D2D synchronous source transmits the D2D resource information indicating the radio resources usable for the D2D proximity service by the broadcast signal. The D2D resource information includes, for example, the information indicating the radio resources usable for the D2D discovery procedure (Discovery resource information), and the information indicating the radio resources usable for the D2D communication (Communication resource information). The UE 100 being the D2D non-synchronous source performs the D2D discovery procedure and the D2D communication based on the D2D resources information received from the eNB 200. The communication resource information may include not only the information indicating the radio resources usable for the transmission and reception of the data (data resource information), but also the information indicating the radio resources usable for the transmission and reception of the Scheduling Assignment (SA) (SA resource information). The SA is the information indicating the location of the time-frequency resources for the reception of the data in the D2D communication. The SA includes the information indicating the time-frequency location (of the time-frequency resources) of the D2D data as the contents.

In the "Out of coverage" or "Partial coverage", for example, the UE 100 becomes the D2D synchronous source. In the "Out of coverage", the UE 100 being the D2D synchronous source transmits the D2D resource information indicating the radio resources usable for the D2D proximity service by the D2D synchronization signal, for example. The D2D synchronization signal is a signal transmitted in the D2D synchronization procedure for establishing the inter-terminal synchronization. The D2D synchronization signal includes the D2DSS and the physical D2D synchronization channel (PD2DSCH). The D2DSS is a signal that provides a synchronization reference of time and frequency. The PD2DSCH is a physical channel that carries more information than the D2DSS. The PD2DSCH carries the above-described D2D resource information (Discovery resource information and Communication resource information). Alternatively, the PD2DSCH may be unnecessary by the D2D resource information being related to the D2DSS.

In the D2D discovery procedure, a discovery signal for discovering the proximity terminal (hereinafter, referred to as "Discovery signal") is transmitted. The system of the D2D discovery procedure includes a first discovery system where the radio resources not uniquely assigned to the UE 100 are used for the transmission of the Discovery signal (Type 1 discovery), and a second discovery system where the radio resources uniquely assigned to each UE 100 are used for the transmission of the Discovery signal (Type 2 discovery). In the second discovery system, the radio resources individually assigned to each transmission of the Discovery signal, or the radio resources semi-persistently assigned are used.

In addition, the mode of the D2D Communication includes a first mode where the eNB 200 or the relay node assigns the radio resources for transmitting the D2D data (the D2D data and/or the control data) (Mode 1), and a second mode where the UE 100 itself selects the radio resources for transmitting the D2D data from the resource pool (Mode 2). The UE 100 performs the D2D communication in any one of the modes. For example, the UE 100 in the RRC_Connected state performs the D2D communication in the first mode, and the UE 100 in the Out of coverage performs the D2D communication in the second mode.

(D2D Group and D2D Group Identifier)

Next, the D2D group (ProSe group) and the D2D group identifier will be described. The D2D group is a group constituted by the UE 100 that uses (or desires to use) the D2D proximity service. For example, the D2D group is a group constituted by the UE 100 forming a synchronous cluster.

In the present embodiment, the UE 100 determines whether the D2D radio signal is from the D2D group where the self-UE 100 belongs based on the D2D group identifier corresponding to the D2D group. For this reason, the UE 100 stores the D2D group identifier corresponding to the D2D group related to the self-UE 100 in the D2D proximity service. When belonging to at least a plurality of D2D groups, the UE 100 stores a plurality of D2D group identifiers including identifiers corresponding to the respective plurality of D2D groups related to the self-UE 100 in the memory 150.

The D2D group identifier is, for example, an identifier assigned to each of the D2D groups. Alternatively, it may be an identifier corresponding to the application in the D2D proximity service. Alternatively, the UE 100 may be an identifier of the D2D group where the UE 100 has belonged in the past, and may be an identifier of the D2D group where the UE 100 currently belongs.

In the present embodiment, the UE 100 transmits at least one or more D2D group identifiers among the plurality of D2D group identifiers stored in the memory 150 to the eNB 200 in at least any one of the following cases.

In the first case, when connected to the eNB 200, the UE 100 transmits at least one or more D2D group identifiers to the eNB 200. Specifically, the UE 100 includes the D2D group identifier in a message related to the RRC Connection Establishment, and transmits the message to the eNB 200. For example, the UE 100 includes the D2D group identifier in the RRC Connection Request message and in the RRC Connection Setup Complete message.

In the second case, the UE 100 includes at least one or more D2D group identifiers in the ProSe indication for transmitting the information related to the D2D proximity service, and transmits the ProSe indication to the eNB 200. In addition, when the UE 100 is interested in the D2D proximity service, the UE 100 may transmit the ProSe indication to the eNB 200. The ProSe indication includes, for example, the information indicating that the UE 100 is interested in the D2D proximity service. Here, the case where the UE 100 is interested in the D2D proximity service may include a case where there is an input of the indication of the transmission or reception of the D2D proximity service into the controller 160 of the UE 100, a case where there is an input of the indication corresponding to it, or the like. In addition, the UE 100 may send the ProSe indication before transmitting the buffer status report for reporting the transmission waiting data in the D2D proximity service (hereinafter, referred to as "ProSe BSR"). Then, the base station can obtain the information related to the D2D proximity service of the UE 100, can manage it, and can use it for the resource assignment and the like in advance. It should be noted that the ProSe indication is different from the ProSe BSR. Therefore, the UE 100 can transmit the ProSe indication at a timing different from that of the ProSe BSR. The UE 100 may transmit the ProSe indication at the same timing as the ProSe BSR.

In the third case, when transmitting the buffer status report for reporting the transmission waiting data in the D2D proximity service (hereinafter, referred to as "ProSe BSR"), the UE 100 transmits at least one or more D2D group identifiers to the eNB 200. The UE 100 includes the D2D group identifier in the ProSe BSR.

Next, among the plurality of D2D group identifiers stored in the memory 150, the D2D group identifier that the UE 100 transmits to the eNB 200 will be described.

First, the UE 100 transmits the identifiers indicating all the D2D groups where the UE 100 can participate among the plurality of D2D groups (hereinafter, referred to as "belonging group IDs") to the eNB 200 as the D2D group identifiers. The belonging group IDs may be all the D2D group identifiers stored in the memory 150, may be the identifiers indicating the D2D groups that the UE 100 actually discovers, and may be the identifiers indicating the D2D groups where the UE 100 actually belongs.

Second, the UE 100 transmits the identifier indicating the D2D group where the UE 100 desires at least one of the transmission and reception of the D2D radio signal (Communication signal, Discovery signal, and the like) among the plurality of D2D groups (hereinafter, referred to as "interest group ID") to the eNB 200 as the D2D group identifier. The interest group ID is, for example, an ID indicating the D2D group where the UE 100 desires to monitor the D2D radio signal. In addition, the interest group ID may be an ID indicating the D2D group where the UE 100 actually monitors the D2D radio signal.

Third, the UE 100 transmits the identifier indicating the D2D group taking priority over the other D2D groups among the plurality of D2D groups (hereinafter, referred to as "priority group ID") to the eNB 200 as the D2D group identifier. The priority group ID is an identifier indicating the D2D group where the UE 100 gives priority to the transmission and reception of the D2D radio signal over the other D2D groups. Alternatively, the priority group ID may be an identifier indicating the D2D group from which the reception of the D2D radio signal is not desired to fail. Alternatively, the priority group ID may be a D2D group identifier corresponding to the priorities.

In the cases of the first to the third described above, the UE 100 can transmit at least any one of the belonging group ID, the interest group ID, and the priority group ID to the eNB 200 as the D2D group identifier.

In the second case, the UE 100 is preferred to transmit any one of the interest group ID and the priority group ID to the eNB 200 as the D2D group identifier. There is a high possibility that the number of the interest group IDs or the priority group IDs is less than the number of the belonging group IDs, and therefore the increase of the message size can be controlled.

In the third case, the UE 100 is preferred to transmit the priority group ID to the eNB 200 as the D2D group identifier. The ProSe BSR is transmitted at high frequency, and therefore when the eNB 200 assigns the time-frequency resources (D2D resources) in the D2D proximity service to the UE 100, the interest (favorite) of the UE 100 can be dynamically reflected. Furthermore, (only) the priority group ID is included in the ProSe BSR to be transmitted at high frequency, whereby the increase of the message size can be controlled.

It should be noted that in the third case, the UE 100 may include the D2D group identifier indicating the D2D group where the D2D radio signal is desired to be transmitted (that is, indicating the destination of the D2D data) in the ProSe BSR, separately from the belonging group ID, the interest group ID, and the priority group ID.

(Operation According to First Embodiment)

Figure 6:
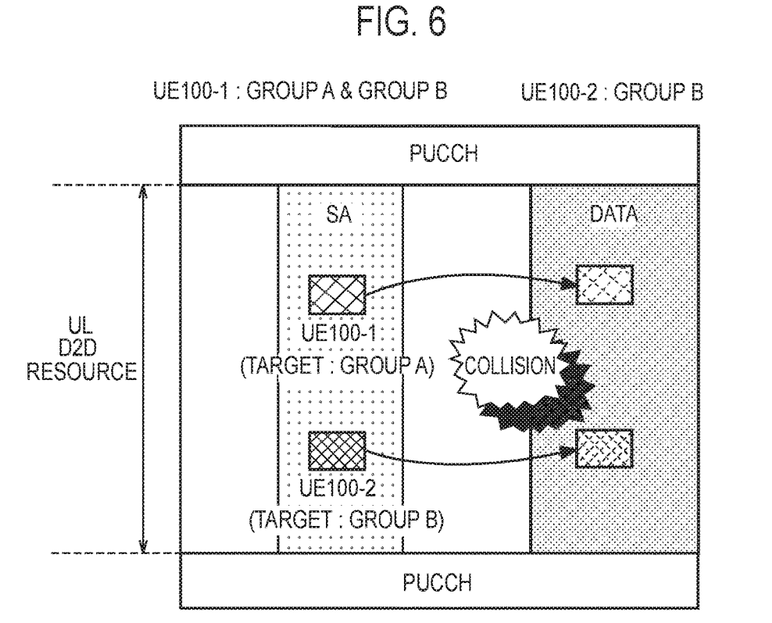
FIG. 6 is an illustrative diagram for illustrating the case where the transmission timings of the D2D radio signals occur at the same time in the D2D proximity service.
Figure 7:
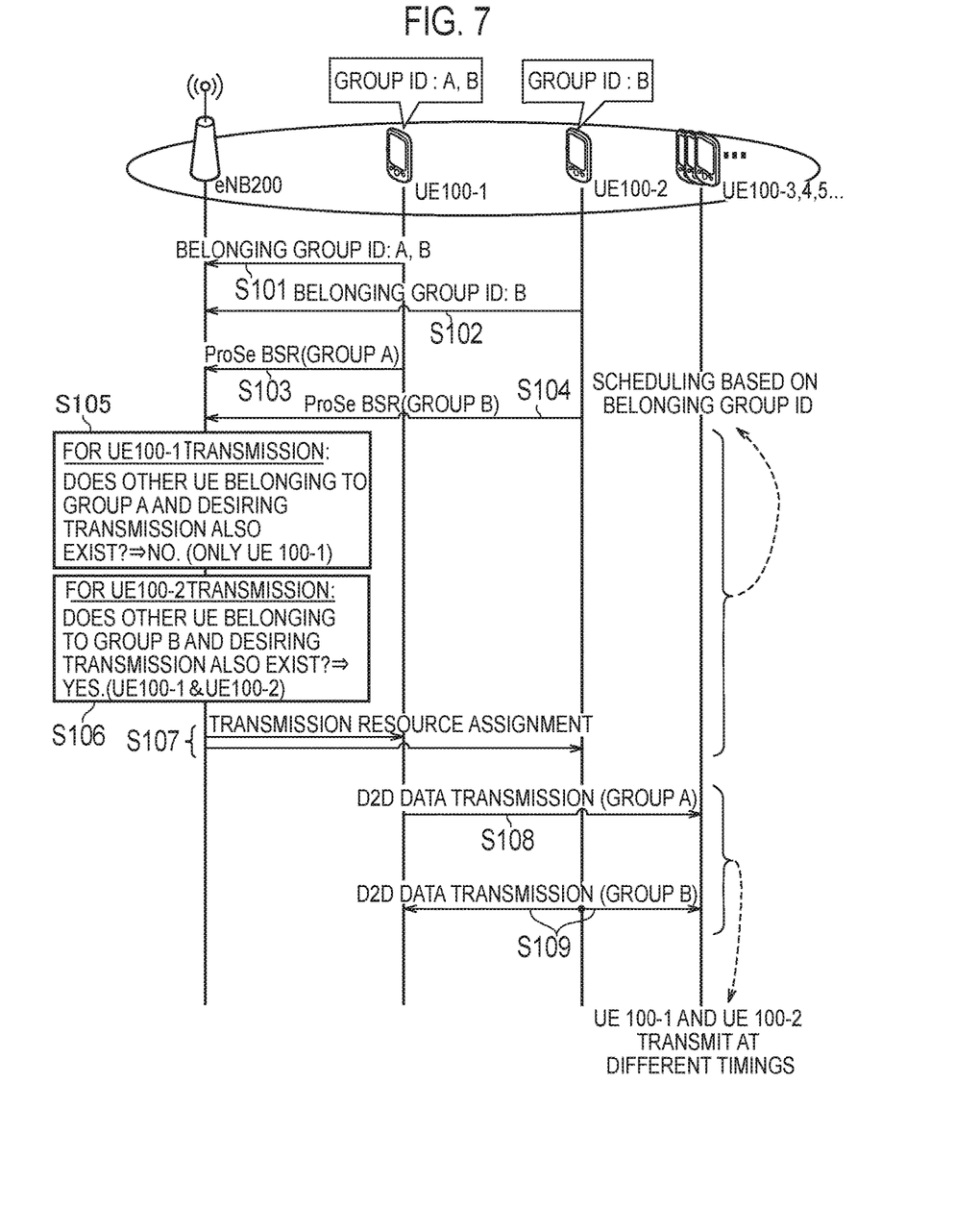
FIG. 7 is a sequence diagram for illustrating the operation according to a first embodiment.

Next, the operation according to the first embodiment will be described with reference to FIGS. 6 and 7. FIG. 6 is an illustrative diagram for illustrating the case where the transmission timings of the D2D radio signals occur at the same time in the D2D proximity service. FIG. 7 is a sequence diagram for illustrating the operation according to the present embodiment.

A case where the UE 100-1 and the UE 100-2 are located in a cell managed by the eNB 200, and the D2D communication is performed in the "In coverage" is assumed (see FIG. 7). The UE 100-1 belongs to the D2D group A and the D2D group B. The UE 100-2 belongs to the D2D group B. For example, the UE 100-1 requests the D2D resources (specifically, the SA resources) from the eNB 200 so as to transmit the D2D communication signal to the D2D group A. On the other hand, the UE 100-2 requests the D2D resources from the eNB 200 so as to transmit the D2D communication signal to the D2D group B. In this case, the eNB 200 performs the scheduling of the D2D resources so that the other UE do not transmit the D2D communication signal at the same time as the UE 100-1 within the D2D group A. On the other hand, the eNB 200 performs the scheduling of the D2D resources so that the other UE do not transmit the D2D communication signal at the same time as the UE 100-2 within the D2D group B. However, the UE 100-1 transmits the D2D communication signal to the D2D group A, and therefore the eNB 200 does not consider the transmission of the UE 100-1 in the scheduling of the UE 100-2. Therefore, as shown in FIG. 6, the eNB 200 may assign the D2D resources at the same timing to the UE 100-1 and the UE 100-2. As a result, the UE 100-1 that cannot perform the transmission and reception at the same timing transmits the SA at the same timing as the UE 100-2, and therefore the UE 100-1 cannot receive the SA from the UE 100-2 in spite of belonging to the group 2. In addition, when the time-frequency direction position of the data is specified by the SA, the UE 100 transmits the data at the same timing as the UE 100-2 even when monitoring the data area used for the transmission of the D2D data, and therefore the UE 100 cannot receive the data from the UE 100-2.

Thus, by the following operations, the reception failure of the D2D radio signal of the UE 100-1 can be reduced even when the UE 100-1 belongs to a plurality of D2D groups.

As shown in FIG. 7, the UE 100-1, 2, 3, or the like is located in the cell that the eNB 200 manages. The UE 100-1 belongs to the D2D group A and the D2D group B. The UE 100-2 belongs to the D2D group B. The UE 100-3,4,5, or the like belongs to at least any one of the D2D group A and the D2D group B. The UE 100-1 stores an identifier indicating each of the D2D group A and the D2D group B. The UE 100-2 stores an identifier indicating the D2D group B.

In step S101, the UE 100-1 transmits an identifier indicating each of the D2D group A and the D2D group B to the eNB 200 as the belonging group ID. The UE 100 may transmit the belonging group ID when connected to the eNB 200, and may transmit the belonging group ID when interested in the D2D proximity service.

In step S102, the UE 100-2 transmits an identifier indicating the D2D group B to the eNB 200 as the belonging group ID in the same manner as the UE 100-1.

In step S103, the UE 100-1 transmits the ProSe BSR including the identifier indicating the D2D group A to the eNB 200 as the D2D group identifier indicating the destination of the D2D data.

In step S104, the UE 100-2 transmits the ProSe BSR including the identifier indicating the D2D group B to the eNB 200 as the D2D group identifier indicating the destination of the D2D data.

In step S105, the eNB 200 determines whether the other UE belonging to the D2D group A and desiring the transmission exists because the identifier indicating the D2D group A indicating the destination of the D2D data is included in the ProSe BSR from the UE 100-1. The eNB 200 determines that the UE 100-2 desiring the transmission belongs to the D2D group B based on the belonging group ID from the UE 100-2 (B). As a result, the eNB 200 determines that the UE belonging to the D2D group A and desiring the transmission is only the UE 100-1 (that is, other UE does not exist).

In step S106, the eNB 200 determines whether the other UE belonging to the D2D group B and desiring the transmission exists because the identifier indicating the D2D group B indicating the destination of the D2D data is included in the ProSe BSR from the UE 100-2. The eNB 200 determines that the UE 100-1 desiring the transmission belongs to the D2D group B based on the belonging group ID from the UE 100-1 (A and B). As a result, the eNB 200 determines that the UE belonging to the D2D group B and desiring the transmission is the UE 100-1 and the UE 100-2 (that is, the other UE exists).

The eNB 200 assigns the D2D resources in the same group so that two or more UEs 100 do not transmit the D2D radio signals at the same time. In addition, based on the above determination result, the eNB 200 assigns the D2D resources so that the transmission timings of the UE 100-1 and the UE 100-2 are different although the UE 100-1 does not set the D2D group B as the destination.

In the present embodiment, as described above, the eNB 200 performs the scheduling of the D2D resources based on the belonging group ID.

In step S107, the eNB 200 transmits the D2D resource information assigned to each of the UE 100-1 and the UE 100-2 (transmission resource assignment).

In step S108, the UE 100-1 transmits the D2D communication signal (D2D data) to the D2D group A based on the D2D resource information received from the eNB 200.

In step S109, the UE 100-2 transmits the D2D communication signal (D2D data) to the D2D group B based on the D2D resource information received from the eNB 200.

The transmission timings of the D2D communication signals of the UE 100-1 and the UE 100-2 are different, and therefore the UE 100-1 can receive the D2D communication signal of the UE 100-2.

In addition, although the first embodiment is described by exemplifying the case where the UE 100 transmits the belonging group ID, it is not limited to this, and instead of, or in addition to the belonging group ID, at least one of the interest group ID and the priority group ID may be transmitted.

(First Modification)

Figure 8:
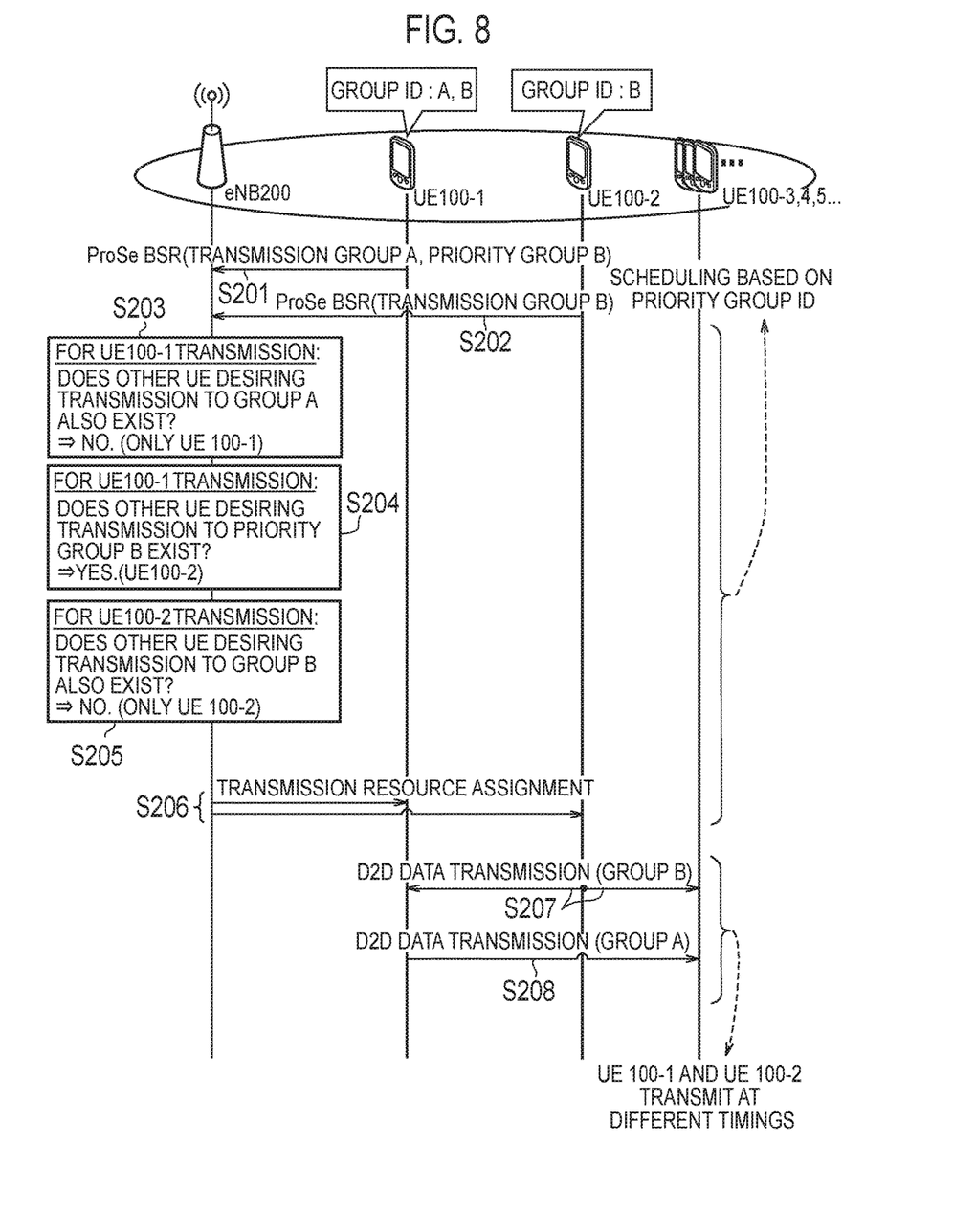
FIG. 8 is a sequence diagram for illustrating the operation according to a first modification of the first embodiment.

Next, the first modification of the first embodiment will be described with reference to FIG. 8. FIG. 8 is a sequence diagram for illustrating the operation according to the first modification of the first embodiment. The description will focus on the difference from the first embodiment described above, and similar parts will be appropriately omitted.

In the first embodiment, the eNB 200 performs the scheduling based on the belonging group ID. In the present modification, the eNB 200 performs the scheduling based on the priority group ID.

In step S201, the UE 100-1 transmits the ProSe BSR including the identifier indicating the D2D group A as the D2D group identifier indicating the destination of the D2D data, and the identifier indicating the D2D group B as the priority group ID to the eNB 200. Here, the priority group ID is different from the D2D group identifier indicating the destination of the D2D data, and therefore the priority group ID indicates the D2D group from which the UE 100-1 desires to receive the D2D radio signal.

In step S202, the UE 100-2 transmits the ProSe BSR including the identifier indicating the D2D group B to the eNB 200 as the D2D group identifier indicating the destination of the D2D data.

In step S203, the identifier indicating the D2D group A indicating the destination of the D2D data is included in the ProSe BSR from the UE 100-1, and therefore it is determined whether the other UE desiring the transmission to the D2D group A exists. The UE 100-2 sets the D2D group B as the destination, and therefore the eNB 200 determines that the UE desiring the transmission to the D2D group A is only the UE 100-1 (that is, the other UE does not exist).

In step S204, the identifier indicating the D2D group B as the priority group ID is included in the ProSe BSR from the UE 100-1, and therefore it is determined whether the UE desiring the transmission to the priority D2D group B exists. The identifier indicating the D2D group B indicating the destination of the D2D data is included in the ProSe BSR from the UE 100-2, and therefore the eNB 200 determines that the UE desiring the transmission to the priority D2D group B is the UE 100-2.

In step S205, the identifier indicating the D2D group B indicating the destination of the D2D data is included in the ProSe BSR from the UE 100-2, and therefore it is determined whether the other UE desiring the transmission to the D2D group B exists. The eNB 200 determines that the UE desiring the transmission to the D2D group B is only the UE 100-2 (that is, the other UE does not exist).

Based on the above determination result, the D2D group B is the priority D2D group of the UE 100-1, and therefore the eNB 200 assigns the D2D resources so that the transmission timings of the UE 100-1 and the UE 100-2 are different although the UE 100-1 does not set the D2D group B as the destination.

The steps S206 to S208 correspond to the steps S107 to S109.

In addition, although the above first modification is described by exemplifying the case where the UE 100 transmits the priority group ID, it is not limited to this, and instead of, or in addition to the priority group ID, at least one of the belonging group ID and the interest group ID may be transmitted.

(Second Modification)

Next, the second modification of the first embodiment will be described. In the first embodiment, the eNB 200 obtains the belonging group ID from the UE 100. The eNB 200 may receive (obtain) the belonging group ID from the higher-level network device of the eNB 200 (higher layer), instead of the UE 100.

For example, when the UE 100 is connected to the eNB 200, the eNB 200 may obtain the context information about the UE 100 including the belonging group ID (UE Context) from the higher-level network device (for example, the MME). The information managed by the higher-level network device is typically low in update frequency, and therefore the eNB 200 is preferable to obtain the belonging group ID regarded as the static information compared to the interest group ID and the priority group ID from the higher-level network device. It should be noted that the eNB 200 may obtain the interest group ID and/or the priority group ID, not limited to the belonging group ID, from the higher-level network device.

Alternatively, when the eNB 200 receives the ProSe indication from the UE 100, the eNB 200 may obtain the belonging group ID from the higher-level network device of the eNB 200. For example, the eNB 200 may request the belonging group ID of the UE 100 being the source of the ProSe indication from the higher-level network device, in response to the reception of the ProSe indication from the UE 100.

(Conclusion)

In the first embodiment described above, the UE 100-1 performs the control of transmitting one or more D2D group identifiers to the eNB 200 when connected to the eNB 200. Alternatively, the UE 100-1 performs the control of transmitting one or more D2D group identifiers to the eNB 200 when interested in the D2D proximity service. Based on the D2D group identifier obtained in advance, the eNB 200 can assign the D2D resources so that the transmission timings of the UE 100-1 and the UE 100-2 are different although the UE 100-1 does not set the D2D group B as the destination. As a result, the UE 100-1 can receive the D2D radio signal from the D2D group not being the destination of the UE 100-1.

In addition, in the first modification of the first embodiment described above, the UE 100-1 includes the identifier indicating the D2D group from which the UE 100-1 desires to receive the D2D radio signal (priority group ID) in the ProSe BSR, and transmits the ProSe BSR to the eNB 200. Based on the priority group ID, the eNB 200 can assign the D2D resources so that the transmission timings of the UE 100-1 and the UE 100-2 are different although the UE 100-1 does not set the D2D group B as the destination. As a result, the UE 100-1 can receive the D2D radio signal from the D2D group not being the destination of the UE 100-1.

In addition, in the second modification of the first embodiment described above, the eNB 200 receives the context information including the D2D group identifier from the higher-level network device. Thus, the eNB 200 can assign the D2D resources so that the transmission timings of the UE 100-1 and the UE 100-2 are different even when the eNB 200 cannot obtain the D2D group identifier from the UE 100.

[Second Embodiment]

Next, the second embodiment will be described. In the first embodiment described above, the case where the D2D proximity service is used in the same cell is described. In the second embodiment, the case where the D2D proximity service is used in a different cell will be described.

In the second embodiment, each of the eNBs 200 sets the receive-only section (that is, transmission prohibition section) for each of the cells managed by its own. In the receive-only section, the UE 100 can perform only the monitoring (reception) of the D2D radio signal, and cannot perform the transmission of the D2D radio signal. The eNB 200 may be set so that the receive-only section of its own and the receive-only section of the neighboring eNB 200 do not overlap with each other.

The eNB 200 notifies the receive-only section set in the eNB 200 to the neighboring eNB 200. In addition, the eNB 200 notifies the receive-only section set in the own station and the receive-only section set in the neighboring eNB 200 to the subordinate UE 100 by the SIB or the individual signal for each UE. The receive-only section may be notified as the D2D resources.

The UE 100 cannot transmit the D2D radio signal in the receive-only section of the own cell, and therefore the other UE located in the other cell transmits the D2D radio signal in the receive-only section of the cell where the UE 100 is located, whereby the Half-Duplex problem that the D2D radio signal from the other UE cannot be received by the transmission of the D2D radio signal of the UE 100 can be solved. Therefore, each UE transmits the D2D radio signal in the receive-only section of the cell where the other party terminal of the D2D proximity service is located, whereby the reception failure of the D2D radio signal due to the Half-Duplex problem can be controlled.

In particular, there is a possibility that delay occurs in the cooperation between the eNBs 200 using the X2 interface, and the cooperation using the X2 interface in the Rel.12 is not assumed. For this reason, when pieces of the UE connected to different eNBs 200 use the D2D proximity service, the method not depending on the individual scheduling of the UE 100 according to the second embodiment can solve the Half-Duplex problem properly.

[Other Embodiments]

Although the above first embodiment is described by exemplifying the D2D Communication, similar operations may be performed in the D2D discovery procedure.

In addition, although in the first embodiment described above, the case where the eNB 200 performs the scheduling is described, it is not limited thereto. In the Out of coverage case (or Partial coverage case), in the case where the "cluster head" being the UE being the synchronization reference in the cluster and controlling the D2D communication in the cluster performs the scheduling, the UE 100 may transmit the D2D group identifier to the cluster head, instead of the eNB 200. The cluster head may perform the scheduling of the D2D resources based on the D2D group identifier in the same manner as the above-described eNB 200.

In each of the embodiments described above, the UE 100 may transmit the Group index, associated with the D2D group, instead of the D2D group identifier associated with the D2D group, and having less amount of information than the D2D group identifier to the eNB 200. For example, the group index is obtained by part of the D2D group identifier being omitted.

Although not particularly mentioned in each of the embodiments, the program causing the computer to perform each process to be performed by the UE 100 may be provided. In addition, the program may be recorded on a computer-readable medium. The use of the computer-readable medium enables the computer to install the program. Here, the computer-readable medium on which the program is recorded may be a non-transitory recording medium. Although the non-transitory recording medium is not particularly limited, for example, it may be a recording medium such as a CD-ROM and a DVD-ROM.

Alternatively, a chip constituted by the memory configured to store the program for executing each process to be performed by the UE 100 and by the processor configured to execute the program stored in the memory (above-mentioned processor 160 or processor 160') may be provided.

In the each above-described embodiment, one example that the present invention is applied to the LTE system has been described; however, the present invention is not limited to apply to the LTE system and may also be applied to systems, other than the LTE system, as well as the LTE system.

In addition, the entire content of JP Patent Application No. 2014-197608 (filed on Sep. 26, 2014) is incorporated in the present specification by reference.

The invention claimed is:

1. A user terminal, comprising:
a controller;
a receiver; and
a transmitter, wherein
the controller is configured to include a first identifier and a second identifier in a message,
the transmitter is configured to transmit the message to a base station,
the first identifier indicates a first group to which the user terminal desires transmitting data by direct Device to Device (D2D) communication,
the second identifier indicates a second group to which the user terminal belongs,
the receiver is configured to receive D2D resource information from the base station, the D2D resource information indicating a time resource used for transmitting the data to the first group, and
the time resource is different from another time resource that is allocated to another user terminal desiring to transmit data to the second group by the direct D2D communication.

2. A processor controlling for a user terminal, the processor communicatively coupled to a memory and configured to:
include a first identifier and a second identifier in a message;
transmit the message to a base station, wherein
the first identifier indicates a first group to which the user terminal desires transmitting data by direct Device to Device (D2D) communication,
the second identifier indicates a second group to which the user terminal belongs,
the processor is further configured to receive D2D resource information from the base station, the D2D resource information indicating a time resource used for transmitting the data to the first group, and
the time resource is different from another time resource that is allocated to another user terminal desiring to transmit data to the second group by the direct D2D communication.

3. A base station, comprising:
a controller including a processor; and
a memory communicatively coupled to the processor, wherein
the controller is configured to:
receive, from a user terminal, a first message including a first identifier and a second identifier;
assign radio resources for a direct Device-to-Device (D2D) communication, on a basis of the first identifier and the second identifier,
the first identifier indicates a first group to which the user terminal desires transmitting data by the direct D2D communication,
the second identifier indicates a second group to which the user terminal belongs,
the controller is further configured to transmit D2D resource information to the user terminal, the D2D resource information indicating a time resource used for transmitting the data to the first group, and
the time resource is different from another time resource that is allocated to another user terminal desiring to transmit data to the second group by the direct D2D communication.

4. The base station according to claim 3, wherein
the controller is further configured to receive, from the another user terminal, a second message including the second identifier indicating the second group to which the another user terminal desires transmitting data by the direct D2D communication.

* * * * *